United States Patent Office 3,806,560
Patented Apr. 23, 1974

---

3,806,560
O-ETHYL-S-N-PROPYL-S-ALKOXY- OR SUBSTITUTED AMINO-CARBONYLMETHYL-PHOSPHORODITHIOLATES

Shigeo Kishino, Tokyo, Akio Kudamatsu, Kanagawa, Shozo Sumi, Tokyo, Kozo Shiokawa, Kanagawa, and Shinichi Yamaguchi, Tokyo, Japan, assignors to Bayer Aktiengesellschaft, Leverkusen, Germany
No Drawing. Filed May 5, 1971, Ser. No. 140,608
Claims priority, application Japan, May 13, 1970, 45/40,147
Int. Cl. A01n 9/36; C07f 9/16
U.S. Cl. 260—943      7 Claims

---

ABSTRACT OF THE DISCLOSURE

O-ethyl-S-n-propyl-S-alkoxy- or substituted aminocarbonylmethyl-phosphorodithiolates of the formula

in which
R is a lower alkoxy, cycloalkoxy, lower alkylamino, cycloalkylamino, benzylamino, dialkylamino, 1-pyrrolidinyl, piperidino or morpholino group, which possess insecticidal, acaricidal and nematocidal properties.

---

The present invention relates to and has for its objects the provision of particular new O-ethyl-S-n-propyl-S-alkoxy- or substituted amino - carbonylmethylphosphorodithiolates, i.e. S-lower alkoxy, cycloalkoxy, lower mono or dialkylamino, cycloalkylamino, benzylamino, or heterocyclic amino-carbonylmethyl-phosphorodithiolates, which possess insecticidal, acaricidal and nematocidal properties, active compositions in the form of mixtures of such compounds with solid and liquid dispersible carrier vehicles, and methods for producing such compounds and for using such compounds in a new way especially for combating harmful insects, acarides and nematodes with other and further objects becoming apparent from a study of the within specification and accompanying examples.

The present invention provides, as new compounds, organic phosphoric acid esters of the general formula

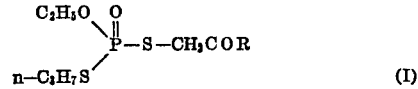

in which
R is a lower alkoxy, cycloalkoxy, lower alkylamino, cycloalkylamino, benzylamino, dialkylamino, 1-pyrrolidinyl, piperidino or morpholino group.

The present invention also provides a process for the preparation of a compound of the general Formula I in which an O-ethyl-S-n-propyldithiophosphate of the general formula

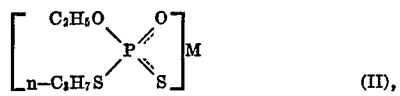

in which M is a metal equivalent or an ammonium radical, is reacted with a halide of the general formula $$\text{Hal—CH}_2\text{—COR} \qquad \text{(III)}$$

in which Hal is a halogen atom, and R has the meaning stated above.

R is preferably a $C_1$–$C_4$ alkoxy group, namely methoxy, ethoxy, n- or iso-propoxy or n-, iso-, sec.- or tert.-butoxy, cyclopentyloxy, cyclohexyloxy, a mono- or di-lower alkylamino group preferably having $C_1$–$C_4$ alkyl groups, cyclopentylamino, cyclohexylamino, benzylamino, 1 - pyrrolidinyl, piperidino or morpholino.

Hal is preferably a chlorine or bromine atom, while M is preferably an ammonium radical or an alkali metal atom, for example a sodium or potassium atom.

As examples of the halides of the Formula III which may be used in the above reaction, the following compounds may be cited:

methoxy- (ethoxy-, n- or iso-propoxy- or n-, iso- or sec.-butoxy-)carbonylmethyl chloride (or bromide),
cyclopentyloxy- (or cyclohexyloxy-)carbonylmethyl chloride (or bromide),
N-methyl- (ethyl-, n- or iso-propyl- or n-, iso- or sec.-butyl-)chloro (or bromo) acetamide,
N-cyclopentyl (or cyclohexyl-)chloro (or bromo) acetamide,
N-benzyl-chloro (or bromo) acetamide,
N,N-dimethyl- (diethyl-, di-n- or di-iso-propyl, di-n-, di-iso or di-sec.-butyl-) chloro (or bromo) acetamide,
chloro (or bromo)-acetyl-morpholide,
chloro (or bromo)-acetyl-piperidide, and
chloro (or bromo)-acetyl-pyrrolidide.

The above reaction is preferably conducted in a solvent or diluent. Although any inert solvent may be used for this purpose, the preferred solvents are water; aliphatic and aromatic hydrocarbons, which may be chlorinated, such as methylene chloride, di-, tri- and tetra-chloroethylenes, chloroform, carbon tetrachloride, benzine, benzene, chlorobenzene, toluene and xylene; ethers such as diethyl ether, di-n-butyl ether, dioxane and tetrahydrofuran; low-molecular-weight ketones and nitriles such as acetone, methylethylketone, methylisopropylketone, methylisobutylketone, acetonitrile and propionitrile; and low-boiling aliphatic alcohols such as methanol, ethanol and isopropanol.

The reaction may be effected at temperatures within a fairly broad range, but generally, the reaction is carried out between about −20° C. and the boiling point of the reaction mixture, preferably between about 0° and 100° C.

The reaction is preferably conducted under amospheric pressure but it is possible to conduct the reaction under reduced or elevated pressure.

In agriculture, especially the cultivation of rice, the damage caused by larvae of insects belonging to the Lepidoptera, such as the rice stem borer (*Chilo suppressalis*) and yellow rice borer (*Tryporyza incertulai*), and mites is often a serious problem. Much research has been directed to the control of these harmful pests but only a few pesticides, almost all of which comprise organic phosphorus compounds, among commercially available pesticides are effective against them. Further, since the same insecticides, for example, have been used in great amounts, there has been a tendency for these harmful insects to acquire resistance to such insecticides.

The compounds of this invention can be used for controlling harmful insects of a broad range such as harmful sucking insects, biting insects and plant parasites. They are effective as insecticides against insects harmful to agriculture, such as insects belonging to the Coleoptera, Lepidoptera, Aphidae, Orthoptera, Isoptera and Acarina, as well as nematodes living on plant and in the soil; accordingly, they can be used agents for protecting plants from such pests.

The compounds of this invention exhibit a pronounced insecticidal activity against the larvae of insects belonging to the Lepidoptera, whose control has been difficult by conventional insecticides. Further, they exhibit a very high insecticidal activity against insects which have acquired resistance to the organic phosphorus compound insecticides of the prior art. Still further, they are effective for controlling rice stem borers and they have a very low toxicity to warm-blooded creatures; in particular, they do not exhibit the acute toxicity possessed by parathion and methylparathion. Nevertheless, the insecticidal activity of the compounds of this invention is comparable or superior to that of parathion and, therefore, they can be used safely and effectively as agricultural chemicals.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations, preparations or compositions, e.g. conventional pesticide formulations, preparations or compositions such as solutions, emulsions, suspensions, emulsifiable concentrates, wettable powders, soluble powders, oils, aerosols, pastes, fumigating powders, dusting powders, granules, pellets and tablets, etc. These are formulated or prepared in known manner, for instance by mixing the active compounds with conventional pesticide dispersible liquid or solid diluent, carriers or extenders optionally with the use of carrier vehicle assistants, e.g. conventional pesticide surface-active agents, including emulsifying agents adhesive agent and/or dispersing agents, whereby, for example, in the case where water is used as diluent, organic solvents and/or surfactants may be added as auxiliary solvents. The following may be chiefly considered for use as conventional carrier vehicles for this purpose: aerosol propellants which are gaseous at normal temperatures and pressures, such as Freon: inert dispersible liquid diluent carriers, including inert organic solvents, such as aromatic hydrocarbons (e.g. benzene, toluene, xylene, aromatic naphtha, dimethyl naphthalene, etc.), halogenated, especially chlorinated aromatic hydrocarbons (e.g. chlorobenzenes etc.), aliphatic hydrocarbons (e.g. benzine, cyclohexane, paraffins, petroleum fractions), chlorinated aliphatic hydrocarbons (e.g. methylene chloride, ethylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, methylethyl ketone, cyclohexanone, etc.) and/or water; as well as inert dispersible finely divided solid carriers, such as ground natural minerals (e.g. clays, talc, pyrophyllite, mica, gypsum, calcite, vermiculite, dolomite, apatite, calcium or magnesium lime, diatomaceous earth, inorganic salts i.e. calcium carbanate, pumice, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic and/or cationic emulsifying agents, (e.g. polyethyleneoxide esters of fatty acids, polyethylene oxide ethers of fatty alcohols, alkyl sulfonates, aryl sulfonates, alkyl dimethyl benzyl ammonium chloride, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles, optionally with the use of carrier vehicle assistants and/or with other known compatible active agents, especially plant protection agents, such as other insecticides, acaricides, nematocides, fungicides, bactericides, herbicides, rodenticides, fertilizers or plant growth-regulating agents, etc., if desired, or in the form of particular dosage preparations for specific application made therefrom, such as solutions, emulsions, suspensions, powders, pastes, and granules which are thus ready for use.

As concerns commercially marketed formulations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.001–5%, by weight of the mixture. Thus, the present invention contemplates over-all compositions which comprise mixtures of a conventional dispersible carrier vehicle such as (1) a despersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.001–95%, by weight of the mixture.

The amount of active compound applied per unit area is usually about 150 to 10,000 grams, preferably 400 to 6000 grams of active compound per hectare. However, in special cases, it may be possible to use more or less, sometimes such variations may be required.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 150 to 10,000 g./hectare preferably 400 to 6000 g./hectare, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e., insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

60 g. of potassium O-ethyl-S-n-propyldithiophosphate are dissolved in 200 ml. of alcohol and 28 g. of ethyl chloroacetate are added dropwise to the solution at room temperature. After the addition, the reaction mixture is stirred for 3 hours at 60°–70° C. and the alcohol is distilled off. The residue is dissolved in benzene, washed with water and 1% aqueous sodium carbonate and dried over anhydrous sodium sulfate. Distillation of benzene gives 59 g. of O-ethyl-S-n-propyl-S-ethoxycarbonylmethyl-phosphorodithiolate, i.e. O-ethyl-S-n-propyl-S-carboethoxymethyldithiophosphate, which has the formula:

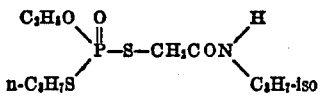
(1)

The compound is characterized by a boiling point of 125–130° C./0.02 mm. Hg and are fractive index $n_D^{20}$ of 1.5050.

EXAMPLE 2

60 g. of potassium O-ethyl-S-n-propyldithiophosphate are dissolved in 150 ml. of acetonitrile and 34 g. of N-isopropylchloroacetamide dissolved in 50 ml. of acetonitrile are added dropwise to the solution at room temperature. After the addition, the reaction mixture is stirred for 4 hours at 60° C. to complete the reaction and the acetonitrile is distilled off. The residue is dissolved in benzene, washed with water and 1% aqueous sodium carbonate and dried over anhydrous sodium sulfate. Distillation of benzene gives 64 g. of colorless oily O-ethyl-S-n-propyl-S - (N - isopropylcarbamoyl)methyl-phosphorodithiolate which has the formula:

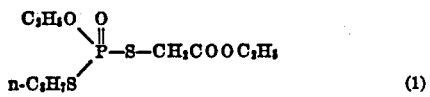

The compound is characterized by a refractive index $n_D^{20}$ of 1.4977.

EXAMPLE 3

60 g. of potassium O-ethyl-S-n-propyldithiophosphate are dissolved in 200 ml. alcohol and 37.5 g. of N,N-diethylchloroacetamide are added dropwise to the solution at room temperature. After the addition, the reaction mixture is stirred for 2 hours at 70–80° C. to complete the reaction and the alcohol is distilled off. The residue is dissolved in benzene, washed with water and 1% aqueous sodium carbonate and dried over anhydrous sodium sulfate. Distillation of benzene gives 61 g. of colorless oily O - ethyl - S - n - propyl - S - (N,N - diethylcarbamoyl)methyl-phosphorodithiolate, which has the formula:

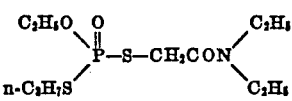

The compound is characterized by a boiling point of 155–158° C./0.1 mm. Hg and a refractive index $n_D^{20}$ 1.5205.

EXAMPLE 4

The following compounds may be synthesized by methods analogous to those of Examples 1–3.

TABLE 1

| Compound No. | Structural formula | Boiling point, °C./mm. Hg | Refractive index, $n_D^{20}$ |
|---|---|---|---|
| 2 | $C_2H_5O\diagdown\overset{O}{\underset{\|}{P}}-S-CH_2COOC_3H_7-iso$ $n-C_3H_7S\diagup$ | | 1.4977 |
| 3 | $C_2H_5O\diagdown\overset{O}{\underset{\|}{P}}-S-CH_2COO-\langle C_6H_5\rangle$ $n-C_3H_7S\diagup$ | | 1.5030 |
| 4 | $C_2H_5O\diagdown\overset{O}{\underset{\|}{P}}-S-CH_2CON\diagdown^H_{CH_3}$ $n-C_3H_7S\diagup$ | | 1.5338 |
| 5 | $C_2H_5O\diagdown\overset{O}{\underset{\|}{P}}-S-CH_2CON\diagdown^H_{C_3H_7-iso}$ $n-C_3H_7S\diagup$ | | 1.5170 |
| 6 | $C_2H_5O\diagdown\overset{O}{\underset{\|}{P}}-S-CH_2CON\diagdown^H_{C_6H_5}$ $n-C_3H_7S\diagup$ | | 1.5285 |
| 7 | $C_2H_5O\diagdown\overset{O}{\underset{\|}{P}}-S-CH_2CON\diagdown^H_{CH_2-C_6H_5}$ $n-C_3H_7S\diagup$ | | 1.5517 |
| 8 | $C_2H_5O\diagdown\overset{O}{\underset{\|}{P}}-S-CH_2CON\diagdown^{CH_3}_{CH_3}$ $n-C_3H_7S\diagup$ | | 1.5310 |
| 9 | $C_2H_5O\diagdown\overset{O}{\underset{\|}{P}}-S-CH_2CON\diagdown^{C_2H_5}_{C_2H_5}$ $n-C_3H_7S\diagup$ | 155–158/0.1 | 1.5205 |

TABLE 1—Continued

| Compound No. | Structural formula | Boiling point, °C./mm. Hg | Refractive index, $n_D^{20}$ |
|---|---|---|---|
| 10 | $\begin{array}{c}C_2H_5O\\ \phantom{xx}\diagdown\phantom{x}\|\phantom{xxxxx}\diagup C_3H_7\text{—iso}\\ \phantom{xxxxxx}P\text{—S—CH}_2CON\\ \phantom{xx}\diagup\phantom{xxxxxxxx}\diagdown C_3H_7\text{—iso}\\ n\text{-}C_3H_7S\end{array}$ | 162–168/0.25 | 1.5141 |
| 11 | $\begin{array}{c}C_2H_5O\\ \phantom{xx}\diagdown\phantom{x}\|\phantom{xxxxx}\diagup C_4H_9\text{—n}\\ \phantom{xxxxxx}P\text{—S—CH}_2CON\\ \phantom{xx}\diagup\phantom{xxxxxxxx}\diagdown C_4H_9\text{—n}\\ n\text{-}C_3H_7S\end{array}$ | .......... | 1.5068 |
| 12 | $\begin{array}{c}C_2H_5O\\ \phantom{xx}\diagdown\phantom{x}\|\\ \phantom{xxxxxx}P\text{—S—CH}_2CO\text{—N}\langle\text{ H }\rangle\\ \phantom{xx}\diagup\\ n\text{-}C_3H_7S\end{array}$ (5-membered ring) | .......... | 1.5438 |
| 13 | $\begin{array}{c}C_2H_5O\\ \phantom{xx}\diagdown\phantom{x}\|\\ \phantom{xxxxxx}P\text{—S—CH}_2CO\text{—N}\langle\text{ H }\rangle\\ \phantom{xx}\diagup\\ n\text{-}C_3H_7S\end{array}$ (6-membered ring) | .......... | 1.5400 |
| 14 | $\begin{array}{c}C_2H_5O\\ \phantom{xx}\diagdown\phantom{x}\|\\ \phantom{xxxxxx}P\text{—S—CH}_2CO\text{—N}\langle\phantom{xx}O\rangle\\ \phantom{xx}\diagup\\ n\text{-}C_3H_7S\end{array}$ (morpholine ring) | .......... | 1.5447 |

EXAMPLE 5

15 parts of Compound 5, 80 parts of diatomaceous earth and clay and 5 parts of the emulsifier "Runnox" (product of Toho Kagaku Kogyu K.K., Japan) are ground and mixed together to form a wettable powder. It is diluted with water for actual application. (Diatomaceous earth and clay (3:2): "Runnox" polyoxyethylenealkylarylether.)

EXAMPLE 6

30 parts of Compound 9, 30 parts of xylene, 30 parts of "Kawakazol" (product of Kawasaki Kasei Kogyo K.K., Japan), and 10 parts of the emulsifier "Sorpol" (product of Toho Kagaku Kogyu K.K., Japan) are mixed with stirring to form an emulsifiable concentration. It is diluted with water for actual application ("Kawakazol": aliphatic hydrocarbons with high boiling point; "Sorpol": polyoxyethylenealkylarylether).

EXAMPLE 7

10 parts of Compound 14, 10 parts of bentonite, 78 parts of talc and 2 parts of lignin sulfonate are formed into a mixture and it is intimately mixed with 25 parts of water. The mixture is finely divided by means of an extruding granulator to give particles of 20–40 mesh, followed by drying at 40–50° C.

EXAMPLE 8

2 parts of Compound 1 and 98 parts of a mixture of talc and clay were ground and mixed together to form a dust (talc and clay (3:1)).

EXAMPLE 9

Preparation of test compound

Solvent: 3 parts by weight of dimethylformamide.
Emulsifier: 0.1 part by weight of alkyl aryl polyglycol ether.

In order to prepare a suitable preparation of an active compound, one part by weight of the active compound NOTE.—The term "parts" used in Examples (5) to (8) means weight.

is mixed with the above amount of the solvent containing the above amount of the emulsifier, and the mixture is diluted with water to form an aqueous preparation containing the active compound at a prescribed concentration.

Test 1.—Test against rice stem borer (*Chilo supperssalis*) larvae

Test procedure.—Egg masses of rice stem borer were attached to a rice, in the tillering stage, planted in a pot of 12 cm. diameter, and on the 7th day from the hatching, 40 ml. per pot of the preparation of the active compound diluted to prescribed concentration was sprayed. The rice was held in a greenhouse. Three days later, the treated stem was examined by breaking it and the killing ratio was calculated from the surviving borers and killed borers.

Test 2.—Test on tobacco cutworm (*Prodenia litura*) larvae

Test procedure.—Sweet-potato leaves are dipped in a preparation of the active compound prepared in Example 9, and they are dried in air and placed in a 9 cm. diameter Petri dish. Then 10 of third-instar tobacco cutworm larvae are put into the dish and the dish is kept in a thermostat chamber maintained at 28° C. After 24 hours have passed, the number of the dead larvae is counted and the killing ratio is calculated.

Test 3.—Test on almond moth (*Ephestia cautella*)

Test procedure.—20 almond-moth mature larvae are put into a wire gauze vessel of 7 cm. diameter and 0.9 cm. height. The vessel is dipped for 10 seconds in a preparation of the active compound prepared in Example 9 at a prescribed concentration, and then the vessel is allowed to stand for 24 hours in a thermostat chamber. The number of dead larvae is counted and the killing ratio is calculated.

These test results are shown in Table 2.

In Table 2, results of the tests of the effects of the compounds of this invention against larvae of harmful insects belonging to the Lepidoptera, namely rice stem borers, tobacco cutworms and almond moths, are shown together with results of similar tests using analogous compounds which are identified by the letters A–D inclusive.

TABLE 2

| | Harmful insects | | | | | | |
|---|---|---|---|---|---|---|---|
| | Tobacco cutworm | | | Almond moth | | | Rice stem borer |
| Concentration | 0.1% | 0.03% | 0.01% | 0.1% | 0.03% | 0.01% | 0.03% |
| Compound: | | | | | | | |
| $\underset{C_2H_5S}{\overset{C_2H_5O}{\diagdown}}\underset{}{\overset{O}{\underset{\|}{P}}}-SCH_2COOC_2H_5$ (Comparison A) | 0 | 0 | 0 | 0 | 0 | 0 | 0 |
| $\underset{n-C_3H_7S}{\overset{C_2H_5O}{\diagdown}}\underset{}{\overset{O}{\underset{\|}{P}}}-SCH_2COOC_2H_5$ (1) | 100 | 100 | 100 | 100 | 100 | 60 | 100 |
| $\underset{n-C_4H_9S}{\overset{C_2H_5O}{\diagdown}}\underset{}{\overset{O}{\underset{\|}{P}}}-SCH_2COOC_2H_5$ (Comparison B) | 0 | 0 | 0 | 50 | 0 | 0 | 20 |
| $\underset{C_2H_5S}{\overset{C_2H_5O}{\diagdown}}\underset{}{\overset{O}{\underset{\|}{P}}}-SCH_2CON\underset{CH_3}{\overset{H}{\diagup}}$ (Comparison C) | 0 | 0 | 0 | 0 | 0 | 0 | 0 |
| $\underset{n-C_3H_7S}{\overset{C_2H_5O}{\diagdown}}\underset{}{\overset{O}{\underset{\|}{P}}}-SCH_2CON\underset{CH_3}{\overset{H}{\diagup}}$ (4) | 100 | 100 | 100 | 100 | 100 | 80 | 100 |
| $\underset{n-C_4H_9S}{\overset{C_2H_5O}{\diagdown}}\underset{}{\overset{O}{\underset{\|}{P}}}-SCH_2CON\underset{CH_3}{\overset{H}{\diagup}}$ (Comparison D) | 50 | 0 | 0 | 80 | 0 | 0 | 0 |

From the test results shown in Table 2, it will be seen that compounds of this invention are especially effective against harmful insects belonging to the Lepidoptera when compared with compounds of analogous structures.

EXAMPLE 10

Test of effects against tobacco cutworms:
The test is conducted in the same manner as in Test 2 of Example 9. Results are shown in Table 3.

TABLE 3.—TEST OF EFFECTS AGAINST TOBACCO CUTWORMS

| Concentration of active compound | Killing ratio (percent) | |
|---|---|---|
| | 300 p.p.m. | 100 p.p.m. |
| Compound number: | | |
| 1 | 100 | 100 |
| 2 | 100 | 100 |
| 3 | 100 | 70 |
| 4 | 100 | 100 |
| 5 | 100 | 100 |
| 6 | 100 | 70 |
| 7 | 100 | 90 |
| 8 | 100 | 100 |
| 9 | 100 | 100 |
| 10 | 100 | 100 |
| 11 | 100 | 90 |
| 12 | 100 | 40 |
| 13 | 100 | 10 |
| 14 | 100 | 100 |
| Sumithion (commercially available comparison) | 80 | 20 |

NOTE.—Sumithion = O,O - dimethyl-O-(3 - methyl-4-nitrophenyl) thiophosphate.

EXAMPLE 11—Test of effects against the house fly

Test procedure.—1 ml. of an aqueous preparation containing the active compound at a prescribed concentration, which is prepared as in Example 9, is dropped onto a filter paper in a 9 cm. diameter Petri dish. Then 10 female mature house flies are put in the dish which is kept in a thermostat chamber maintained at 28° C. After 24 hours have passed, the number of dead flies is counted and the killing ratio is calculated.

The results are shown in Table 4.

TABLE 4.—RESULTS OF TESTS ON THE HOUSE FLY

| Active ingredient concentration | Killing ratio (percent) | |
|---|---|---|
| | 1,000 p.p.m. | 100 p.p.m. |
| Compound number: | | |
| 3 | 100 | 80 |
| 8 | 100 | 100 |
| 9 | 100 | 70 |
| 10 | 100 | 80 |
| 11 | 100 | 60 |
| 13 | 100 | 80 |
| 14 | 100 | 80 |
| (Comparison C) | 30 | 0 |
| (Comparison D) | 50 | 0 |

EXAMPLE 12

Test of effects against the brown planthopper (*Nilaparvata lugens*)

Test procedure.—An aqueous preparation containing the active compound at a prescribed concentration, which is prepared in the same manner as in Example 9, is sprayed onto 10 cm. high rice seedlings, each planted in a 12 cm. diameter pot, in an amount of 10 ml. per pot. After the sprayed liquor has dried, the pot is covered with a cylindrical wire cage of 7 cm. diameter and 14 cm. height, into which 30 female mature brown planthoppers are put. The pot is allowed to stand in a thermostat chamber for 2 4hours at 28° C. and the number of the dead planthoppers is counted and the killing ratio is calculated.

The test results are shown in Table 5.

TABLE 5

Results of tests of effects against brown planthoppers

| Compound No.: | Killing ratio (%) 500 p.p.m. |
| --- | --- |
| 6 | 71.4 |
| 7 | 80.5 |
| 8 | 70 |
| 9 | 73.7 |
| 10 | 69.6 |
| 13 | 68.5 |
| 14 | 91.2 |
| Marason[1] (commercially available comparison) | 61.6 |

[1] Marason: O,O-dimethyl - S - (dicarbethoxyethyl) dithiophosphate.

EXAMPLE 13

Test of effects on green rice leafhoppers
(*Nephotettix cincticeps*)

The test is conducted in the same manner as in Example 12 but employing 30 female green rice leafhoppers having resistance to prior-art organic phosphorus chemicals. Results are shown in Table 6.

TABLE 6

Results of tests of effects against green rice leaf-hoppers having resistance to prior-art organic phosphorus chemicals.

| Compound No. | Killing ratio (%) 500 p.p.m. |
| --- | --- |
| 6 | 100 |
| 7 | 98.4 |
| 8 | 100 |
| 9 | 100 |
| 10 | 100 |
| 13 | 100 |
| 14 | 100 |

EXAMPLE 14

Test on effects against the carmine mite
(*Tetranychus telarius*)

Test procedure.—A kidney-bean plant having two developing leaves and planted in a 6 cm. diameter pot is infected with 50–100 carmine mite imagines and nymphs. Two days after the infection, an aqueous preparation containing the active compound at a prescribed concentration, which is prepared in the same manner as in Example 9, is sprayed in an amount of 40 ml. per pot. Each pot is kept in a greenhouse for 10 days and the control effect is evaluated. The evalution is expressed by the index rated on the following scale:

Index:
3: No living imago or nymph
2: less than 5% of living imagines and nymphs based on the untreated control
1: 5–50% of living imagines and nymphs based on the untreated control
0: more than 50% of living imagines and nymphs based on the untreated control.

The test results are shown in Table 7.

TABLE 7.—RESULTS OF TESTS ON THE CARMINE MITES

| Active compound concentration | Control effect index | | |
| --- | --- | --- | --- |
| | 0.1% | 0.3% | 0.01% |
| Compound number: | | | |
| 1 | 3 | 1 | 1 |
| 5 | 3 | 2 | 2 |
| 6 | 3 | 3 | 2 |
| 7 | 3 | 3 | 1 |
| 8 | 3 | 3 | 3 |
| 9 | 3 | 3 | 1 |
| 10 | 3 | 3 | 3 |
| 11 | 3 | 3 | 3 |
| 12 | 3 | 3 | 3 |
| 13 | 3 | 3 | 3 |
| 14 | 3 | 3 | 3 |
| Sappiran (commercially available comparison) | 2 | 0 | 0 |

Note.—Sappiran=p-chlorophenyl-p'-chlorobenzenesulfonate.

It will be appreciated that the instant specification and examples are set forth by way of illustration and not limitation, and that various modifications and changes may be made without departing from the spirit and scope of the present invention.

What is claimed is:

1. Phosphoric acid esters of the general formula $$\begin{array}{c} C_2H_5O \\ \phantom{C_2H_5O} \diagdown \phantom{O} \\ \phantom{CCC} P-S-CH_2COR \\ n\text{-}C_3H_7S \diagup \phantom{ABCD} \end{array} \quad (I)$$

in which
R is a lower alkylamino, cycloalkylamino, benzylamino or dialkylamino group.

2. Compounds according to claim 1 in which R is a lower alkylamino group, a di-lower alkylamino group or a benzylamino group.

3. Compound according to claim 1 wherein such compound is O - ethyl - S-n-propyl-S-methylaminocarbonyl-methyl-phosphorodithiolate of the formula $$\begin{array}{c} C_2H_5O \phantom{XX} O \phantom{XXXXXX} H \\ \diagdown \phantom{X} \| \phantom{XXXXXX} \diagup \\ P-S-CH_2CON \\ \diagup \phantom{XXXXXXXXXX} \diagdown \\ n\text{-}C_3H_7S \phantom{XXXXXXXX} CH_3 \end{array} \quad (4)$$

4. Compound according to claim 1 wherein such compound is O-ethyl - S - n-propyl-S-benzylaminocarbonyl-methyl-phosphorodithiolate of the formula $$\begin{array}{c} C_2H_5O \phantom{XX} O \phantom{XXXXXX} H \\ \diagdown \phantom{X} \| \phantom{XXXXXX} \diagup \\ P-S-CH_2CON \\ \diagup \phantom{XXXXXXXXXX} \diagdown \\ n\text{-}C_3H_7S \phantom{XXXXXXXX} CH_2\text{-}C_6H_5 \end{array} \quad (7)$$

5. Compound according to claim 1 wherein such compound is O-ethyl-S-n-propyl - S - dimethylaminocarbonyl-methylphosphorodithiolate of the formula $$\begin{array}{c} C_2H_5O \phantom{XX} O \phantom{XXXXXX} CH_3 \\ \diagdown \phantom{X} \| \phantom{XXXXXX} \diagup \\ P-S-CH_2CON \\ \diagup \phantom{XXXXXXXXXX} \diagdown \\ n\text{-}C_3H_7S \phantom{XXXXXXXX} CH_3 \end{array} \quad (8)$$

6. Compound according to claim 1 wherein such compound is O - ethyl - S - n-propyl-S-diethylaminocarbonyl-methyl-phosphorodithiolate of the formula $$\begin{array}{c} C_2H_5O \phantom{XX} O \phantom{XXXXXX} C_2H_5 \\ \diagdown \phantom{X} \| \phantom{XXXXXX} \diagup \\ P-S-CH_2CON \\ \diagup \phantom{XXXXXXXXXX} \diagdown \\ n\text{-}C_3H_7S \phantom{XXXXXXXX} C_2H_5 \end{array} \quad (9)$$

7. Compound according to claim 1 wherein such compound is O - ethyl - S - n-propyl-S-diiso-propylaminocarbonylmethyl-phophorodithiolate of the formula
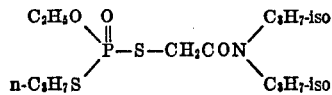 (10)
References Cited
UNITED STATES PATENTS
3,134,801   5/1964   Sehring et al. _____ 260—943
FOREIGN PATENTS
941,636   11/1963   Great Britain _____ 260—943
ANTON H. SUTTO, Primary Examiner
U.S. Cl. X.R.
260—247.1, 293.85, 326.61, 941, 963; 424—200, 203, 212

UNITED STATES PATENT OFFICE
CERTIFICATE OF CORRECTION

Patent No. 3,806,560      Dated April 23, 1974

Inventor(s) SHIGEO KISHINO ET AL

It is certified that error appears in the above-identified patent and that said Letters Patent are hereby corrected as shown below:

Col. 1, lines 62-65, Compound (II), correct the formula to read as follows:

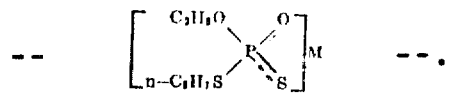

Col. 6, Table 1, Compound (2), correct the formula to read as follows:

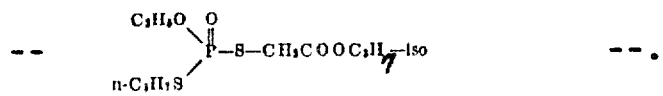

Signed and sealed this 5th day of November 1974.

(SEAL)
Attest:

McCOY M. GIBSON JR.
Attesting Officer

C. MARSHALL DANN
Commissioner of Patents